(12) United States Patent
Williams et al.

(10) Patent No.: US 12,253,000 B2
(45) Date of Patent: Mar. 18, 2025

(54) OIL SYSTEM OF A GAS TURBINE ENGINE, COMPRISING A FIRST OIL CIRCUIT AND AT LEAST ONE SECOND OIL CIRCUIT, AND GAS TURBINE ENGINE

(71) Applicants: Rolls-Royce Deutschland Ltd & Co KG, Blankenfelde-Mahlow (DE); Rolls-Royce plc, London (GB)

(72) Inventors: David Williams, Bristol (GB); Stefan Menczykalski, Berlin (DE); Stephan Uhkötter, Berlin (DE); Uwe Kracht, Berlin (DE); Wolfram Kurz-Hardjosoekatmo, Kleinmachnow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 25 days.

(21) Appl. No.: 17/795,072

(22) PCT Filed: Jan. 18, 2021

(86) PCT No.: PCT/EP2021/050916
§ 371 (c)(1),
(2) Date: Jul. 25, 2022

(87) PCT Pub. No.: WO2021/151703
PCT Pub. Date: Aug. 5, 2021

(65) Prior Publication Data
US 2023/0101143 A1    Mar. 30, 2023

(30) Foreign Application Priority Data

Jan. 30, 2020  (DE) .................... 10 2020 102 292.1

(51) Int. Cl.
*F01D 25/20* (2006.01)
*F01M 1/20* (2006.01)
(Continued)

(52) U.S. Cl.
CPC ............... *F01D 25/20* (2013.01); *F01M 1/20* (2013.01); *F02C 7/06* (2013.01); *F02C 7/32* (2013.01);
(Continued)

(58) Field of Classification Search
CPC ........ F01D 25/20; F05D 2260/98; F02C 7/06; F16H 57/0434; F16H 57/0435;
(Continued)

(56) References Cited

U.S. PATENT DOCUMENTS 6,267,147 B1   7/2001  Rago
8,387,665 B2 * 3/2013  Lundberg ............... F16L 55/053
                                                   303/DIG. 11
(Continued)

FOREIGN PATENT DOCUMENTS

DE         69830026 T2    9/2005
DE     102017128451 A1    6/2019
(Continued)

OTHER PUBLICATIONS

German Search Report dated Sep. 21, 2020 from counterpart German Patent Application No. 10 2020 102 292.1.
(Continued)

*Primary Examiner* — Minh Truong
(74) *Attorney, Agent, or Firm* — SHUTTLEWORTH & INGERSOLL, PLC; Timothy J. Klima

(57) ABSTRACT

An oil system of a gas turbine engine, includes a first oil circuit and a second oil circuit. Via the oil circuits, oil is supplied to a hydraulic load of a transmission of the engine. Downstream of the load, in the region of a return of the
(Continued)

transmission, oil is introduced into the oil circuits from the transmission. Upstream of the load, in the region of inlets, oil can be introduced into the transmission from the oil circuits. The second oil circuit includes an oil accumulator between the return and the inlet of the second oil circuit. The oil accumulator is configured such that, according to a feed pressure of the oil upstream of the inlet, oil is stored in the oil accumulator or oil stored in the oil accumulator is fed toward the inlet.

15 Claims, 6 Drawing Sheets

(51) Int. Cl.
  *F02C 7/06* (2006.01)
  *F02C 7/32* (2006.01)
  *F02C 7/36* (2006.01)
  *F15B 1/26* (2006.01)
  *F16H 57/04* (2010.01)

(52) U.S. Cl.
  CPC ............... *F02C 7/36* (2013.01); *F15B 1/26* (2013.01); *F16H 57/0435* (2013.01); *F16H 57/0442* (2013.01); *F05D 2220/32* (2013.01); *F05D 2260/98* (2013.01)

(58) Field of Classification Search
  CPC ... F16H 57/0441; F16H 57/0445; F01M 1/02; F01M 1/20; F15B 1/26
  See application file for complete search history.

(56) References Cited

U.S. PATENT DOCUMENTS

| | | | |
|---|---|---|---|
| 10,012,305 B2* | 7/2018 | Louis | F16H 57/0442 |
| 10,060,415 B2* | 8/2018 | Bogaert | F03D 80/70 |
| 11,174,797 B2* | 11/2021 | Gebhard | F02C 7/36 |
| 2012/0227820 A1* | 9/2012 | Poster | F01M 5/001 184/6 |
| 2013/0133454 A1* | 5/2013 | Barthel | F03D 80/70 74/468 |
| 2013/0319006 A1 | 12/2013 | Parnin et al. | |
| 2017/0059032 A1* | 3/2017 | Son | F16H 57/0441 |
| 2017/0234158 A1* | 8/2017 | Savela | F01D 25/164 416/1 |
| 2018/0073395 A1 | 3/2018 | Parnin et al. | |
| 2019/0316488 A1 | 10/2019 | Menczykalski et al. | |
| 2020/0191054 A1* | 6/2020 | Parnin | F01D 25/20 |
| 2021/0270249 A1* | 9/2021 | Pedersen | F03D 80/70 |

FOREIGN PATENT DOCUMENTS

| | | |
|---|---|---|
| DE | 102019106837 A1 | 9/2019 |
| EP | 1703174 A1 | 9/2006 |
| EP | 3557028 A1 | 10/2019 |

OTHER PUBLICATIONS

International Search Report and Written Opinion dated Apr. 20, 2021 from counterpart International Patent Application No. PCT/EP2021/050916.

* cited by examiner

OIL SYSTEM OF A GAS TURBINE ENGINE, COMPRISING A FIRST OIL CIRCUIT AND AT LEAST ONE SECOND OIL CIRCUIT, AND GAS TURBINE ENGINE

This application is the National Phase of International Application PCT/EP2021/050916 filed Jan. 18, 2021 which designated the U.S.

This application claims priority to German Patent Application No. 102020102292.1 filed Jan. 30, 2020, which applications are incorporated by reference herein.

The present disclosure relates to an oil system of a gas turbine engine, comprising a first oil circuit and at least one second oil circuit, and to a gas turbine engine with such an oil system.

A gas turbine engine with a fan is known from EP 3 557 028 A1. The gas turbine engine comprises a transmission which is operatively connected both to a core shaft and to the fan. Furthermore, the gas turbine engine is designed with a first oil circuit, with a second oil circuit and with at least one third oil circuit. The oil circuits are fluidically coupled both to at least one inlet of the transmission and to at least one outlet of the transmission. Furthermore, at least one oil reservoir is provided, into which oil can be introduced from the transmission and from which oil can be removed and can be guided in the direction of the transmission.

In particular during an inclined flight position, in zero gravity or with negative G forces occurring during the flight mode and acting on the hydraulic fluid volume, for example during a sudden drop in the flight altitude of an aircraft, there is the possibility that oil in the oil reservoir is moved from a lower region, from which oil is removed from the oil reservoir and guided in the direction of hydraulic consumers of an aircraft engine by a feed pump, in the direction of an upper region. In contrast to a normal flight situation, there is the possibility, during the last-described operating states of a gas turbine engine, that only a reduced oil volume flow is conveyed by a feed pump, by means of which an adequate oil supply to the hydraulic consumers of a gas turbine engine cannot be ensured.

This means that the transmission may not be able to be supplied with oil or lubricant to the desired extent over the entire operating state range of the gas turbine engine. As a result, there is the possibility, during prolonged operating states involving undersupply, the transmission will be subject to thermal and mechanical stresses to an extent which will permanently compromise operation. This is particularly the case when a transmission of this type, such as a planetary transmission, is designed with plain bearings.

The object on which the present disclosure is based is to provide an oil system of a gas turbine engine and a gas turbine engine with an oil system, in which a transmission can be supplied with oil to a sufficient extent over the entire operating range of a gas turbine engine.

This object is achieved with an oil system of a gas turbine engine and with a gas turbine engine for an aircraft with features as disclosed herein, respectively.

According to a first aspect, an oil system of a gas turbine engine, comprising a first oil circuit and at least one second oil circuit, is provided. At least one hydraulic consumer of a transmission of the gas turbine engine can be charged with oil via the two oil circuits. Oil can be introduced from the transmission into the oil circuits downstream of the hydraulic consumer of the transmission in the region of a return of the transmission and can be introduced into the transmission from the oil circuits in each case upstream of the hydraulic consumer via inlets. At least the second oil circuit has an oil accumulator between the return of the transmission and the inlet of the second oil circuit. The oil accumulator is designed in such a way that oil can be stored in the oil accumulator depending on a supply pressure of the oil upstream of the inlet of the second oil circuit or oil stored in the oil accumulator can be guided in the direction of the inlet of the second oil circuit.

By means of the oil system according to the present disclosure, for example, a bearing unit, such as a plain bearing, of a transmission of a gas turbine engine can be supplied with oil to a sufficient extent even during unfavorable operating state profiles of a gas turbine engine, during which an oil supply via a feed pump or the like is reduced or interrupted. This results from the fact that, when there is a reduced or interrupted oil supply, the supply pressure in the region of the inlets of the oil circuits on the transmission is reduced compared to a supply pressure of the oil during normal operation of the oil system. The reduced supply pressure and the thus corresponding low oil volume flow in the direction of the transmission is used here as a criterion for the fact that oil stored in the region of the oil accumulator is to be pushed out of the oil accumulator and introduced into the transmission via the second oil circuit to supply the hydraulic consumer of the transmission.

In an embodiment of the oil system according to the present disclosure that can be operated with little outlay on control and regulation, the oil accumulator is designed as a spring accumulator. It can be provided that the oil accumulator has a piston of a cylinder-piston unit that is arranged in a longitudinally displaceable manner in a cylinder and that is cushioned against the supply pressure acting in the second oil circuit. The supply of oil to the bearing unit of the transmission on the oil reservoir side is therefore only dependent on the spring force and the supply pressure. This also means that the oil supply to the hydraulic consumer is independent of the sign of the gravitational acceleration because of the spring-side actuation of the piston and no additional actuation of the oil accumulator by an actuator actuated electrically, fluidically or in another suitable manner is required.

In an advantageous embodiment of the oil system according to the present disclosure, the piston and the cylinder delimit an oil storage chamber, the volume of which varies depending on an axial position of the piston in the cylinder. Oil can be introduced into the oil storage chamber in the region downstream of the return of the transmission and upstream of the inlet of the second oil circuit counter to the spring force and can be introduced from the oil storage chamber into the second oil circuit upstream of the inlet by the spring force counter to the supply pressure.

The oil reservoir can be integrated into oil systems of existing engine systems with little structural outlay if the oil storage chamber upstream of the inlet is connected via a stub line to a line of the second oil circuit, said line running in the direction of the inlet of the second oil circuit.

If, downstream of the return, a line of the second oil circuit opens into the oil storage chamber and the oil storage chamber is connected to the inlet via a further line of the second oil circuit, said further line running into the transmission between the oil storage chamber and the inlet of the second oil circuit, the oil between the return and the inlet of the second oil circuit into the transmission is advantageously guided through the oil storage chamber. As a result, a flushing oil volume flow flows through the oil storage chamber in the normal operating state, during which there is a sufficient supply of oil to the transmission via the second oil circuit and during which no volume of oil is pushed out of the oil storage chamber in the direction of the inlet by the spring force. This is a simple way of avoiding that the oil stored in the oil storage chamber has too long a dwell time in the oil storage chamber and its temperature rises to an undesired extent. The resulting limitation of the oil temperature in the oil accumulator prevents in a simple manner the oil stored in the oil accumulator from igniting due to operating temperatures that are too high.

In addition to this or as an alternative to this, there is the possibility that oil can be guided out of the oil storage chamber in the direction of a piston chamber which is arranged on that side of the piston which faces away from the oil storage chamber and is delimited by the piston and by the cylinder. This also ensures that a flushing oil volume flow is guided through the oil storage chamber, which avoids an undesired increase in the operating temperature of the oil stored in the oil storage chamber.

The oil can be guided from the oil storage chamber into the piston chamber, for example in the region of one or more bores in the piston or via one or more recesses, such as a groove or the like, provided in the contact region between an outer side of the piston and an inner side of the cylinder. Furthermore, there is also the possibility of releasing or blocking the connection between the oil storage chamber and the piston chamber depending on the pressure drop between the pressure in the oil storage chamber and the pressure in the piston chamber. In any case, the flow cross section available for the flushing oil flow is dimensioned in such a way that the functioning of the oil reservoir is not impaired by the flushing oil volume flow.

Furthermore, it can be provided that oil can be guided out of the piston chamber in the direction of a substantially pressure-free region of the oil system. The connection of the piston chamber to the substantially pressure-free region ensures that, despite an oil volume flow flowing from the oil storage chamber into the piston chamber, such as a leakage volume flow or the above-described flushing oil volume flow, a pressure is in each case set in the piston chamber that does not affect the functioning of the oil accumulator.

In the present case, the functioning of the oil accumulator is understood to mean that, when the oil system is in defined operating states, oil is stored in the oil storage chamber or oil is pushed out of the oil storage chamber in the direction of the inlet of the second oil circuit in order to avoid an insufficient supply of oil to the transmission. For this purpose, the oil system is designed in such a way that oil is stored in the oil storage chamber when the compressive force resulting from the supply pressure in the second oil circuit and acting on the piston exceeds the spring force of the spring accumulator or the oil accumulator.

In addition, the oil system is designed in such a way that the functioning of the oil reservoir is independent of whether the flushing oil volume flow is guided from the return of the transmission in the direction of the inlet of the second oil circuit through the oil storage chamber and/or from the return through the oil storage chamber in the direction of the piston chamber and from there in the direction of the substantially pressure-free region.

Furthermore, the oil system is designed in such a way that both the filling of the oil storage chamber with oil and the pushing of the oil out of the oil storage chamber in the direction of the inlet of the second oil circuit take place independently of the pressure present in the substantially pressure-free region of the oil system. This is achieved, for example, by the fact that the pressure of the substantially pressure-free region, which may vary depending on the ambient pressure of the transmission and the oil system and is also applied in the region of the piston chamber, is applied via the inlet of the second oil circuit into the transmission as a pressure component in addition to the supply pressure in the oil storage chamber. Then, when the oil system is in operation, the piston is designed to be pressure-balanced with respect to the pressure in the piston chamber, given a corresponding design of the effective surfaces of the piston, to which the pressure in the oil storage chamber and the pressure in the piston chamber are respectively applied.

In addition, it can be provided that oil, which only flows in the form of a leakage oil volume flow from the oil storage chamber in the direction of the piston chamber, can be guided out of the piston chamber in the direction of the substantially pressure-free region of the oil system. This is a simple way of avoiding an undesired increase in pressure in the piston chamber, which impairs the functioning of the oil accumulator.

In a further embodiment of the oil system according to the present disclosure, a spring force of a spring unit, which acts on the piston and counteracts a compressive force, and an effective surface of the piston are matched to one another. They are matched such that oil stored in the oil storage chamber can be guided by the spring unit out of the oil storage chamber in the direction of the inlet of the second oil circuit when the pressure in the oil storage chamber is smaller than a defined value of the supply pressure. The compressive force, which also acts on the piston, is equal to the product of the supply pressure, acting in the oil storage chamber, of the second oil circuit and the effective surface of the piston, to which the supply pressure is applied.

The effect achieved by matching the spring force and the effective surface of the piston is that the hydraulic consumer of the transmission of the gas turbine engine is supplied with oil to a sufficient extent from the oil accumulator when there is a supply pressure in the second oil circuit, which corresponds to an undersupply of the hydraulic consumer with oil.

In a structurally simple embodiment of the oil system according to the present disclosure, the pressure-free region is the return of the transmission or a region of the first oil circuit and/or the second oil circuit running downstream of the return.

Furthermore, it can also be provided that the pressure-free region is a storage chamber of the gas turbine engine.

In each case at least one oil pump, by means of which oil can be conveyed in the direction of the inlets, can be provided between the return of the transmission and the inlets of the oil circuits.

If the second oil circuit has a nonreturn valve upstream of the oil accumulator, the oil volume to be kept available in the region of the oil accumulator for a sufficient supply of oil can be reduced in comparison to a design without a nonreturn valve. The nonreturn valve releases the connection between the return of the transmission and the oil accumulator when there is a positive pressure drop between the pressure in the region of the second oil circuit upstream of the nonreturn valve and the pressure in the region of the second oil circuit downstream of the nonreturn valve. The effect achieved by this is that, in the event of an undersupply of the hydraulic consumer of the transmission via the oil system, only that region of the second oil circuit downstream of the nonreturn valve is charged with the volume of oil discharged from the oil accumulator.

In a further embodiment of the oil system according to the present disclosure, the second oil circuit next to the inlet of the transmission, via which the hydraulic consumer of the transmission can be supplied with oil from the second oil circuit, is in operative connection with a further region of the gas turbine engine.

If the oil accumulator is connected directly to the inlet of the second oil circuit via a line, the oil volume to be kept available in the oil accumulator to maintain a sufficient supply of oil for the hydraulic consumer of the transmission is as small as possible.

If at least one third oil circuit is provided, via which oil can be introduced directly from the return of the transmission via an inlet of the third oil circuit into the transmission and can be fed to the hydraulic consumer of the transmission, the hydraulic consumer can be supplied with oil to the desired extent.

As an alternative to this, a further embodiment of the oil system according to the present disclosure is designed with at least one third oil circuit. Via the third oil circuit, oil can be introduced from the return of the transmission via an inlet of the third oil circuit into the transmission and can be fed to the hydraulic consumer of the transmission. In addition, there is also the possibility that other hydraulic consumers of the transmission and/or further regions of the gas turbine engine can also be charged with oil via the third oil circuit.

If the hydraulic consumer, which can be supplied with oil via the oil circuits, of the transmission comprises at least one bearing unit, preferably a plain bearing of a planet gear of the transmission designed as a planetary transmission, damage to the function of a bearing unit or of a plain bearing, such as seizing or the like, as a result of an insufficient supply of oil is easily avoidable.

According to another aspect of the present disclosure, a gas turbine engine for an aircraft having an oil system configured in the above manner is provided.

Furthermore, the present disclosure may relate to such a gas turbine engine which comprises an engine core having a turbine, having a compressor, and having a core shaft connecting the turbine to the compressor. Such a gas turbine engine may comprise a fan having a plurality of fan blades, which is positioned upstream of the engine core.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure may be particularly, although not exclusively, beneficial for fans that are driven via a transmission. Accordingly, the gas turbine engine may comprise a transmission that receives an input from the core shaft and outputs drive for the fan so as to drive the fan at a lower rotational speed than the core shaft. The input to the transmission may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed). The transmission herein may be configured as a transmission as has been described in more detail above.

The gas turbine engine as described and claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, the second compressor and the second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The transmission may be arranged so as to be driven by that core shaft (for example the first core shaft in the example above) which is configured to rotate (for example during use) at the lowest rotational speed. For example, the transmission may be arranged so as to be driven only by the core shaft (for example only by the first core shaft, and not the second core shaft, in the example above) that is configured to rotate (for example during use) at the lowest rotational speed. Alternatively thereto, the transmission may be arranged so as to be driven by one or a plurality of shafts, for example the first and/or the second shaft in the example above.

In the case of a gas turbine engine as described and claimed herein, a combustion chamber may be provided axially downstream of the fan and of the compressor(s). For example, the combustion chamber may lie directly downstream of the second compressor (for example at the exit of the latter), when a second compressor is provided. By way of a further example, the flow at the exit of the compressor may be fed to the inlet of the second turbine, when a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that the angle of incidence of said variable stator blades may be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of magnitude of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios can commonly be referred to as the hub-to-tip ratio. The radius at the hub and the radius at the tip can both be measured at the leading periphery part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine center line and the tip of the fan blade at the leading periphery of the latter. The diameter of the fan (which can simply be double the radius of the fan) may be larger than (or of the order of magnitude of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of a non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading at cruise conditions may be more than (or of the order of magnitude of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure may have any desired bypass ratio, wherein the bypass ratio is defined as the ratio of the mass flow rate of the flow through the bypass duct to the mass flow rate of the flow through the core at cruise conditions. In the case of some arrangements, the bypass ratio may be more than (or of the order of magnitude of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and claimed herein may be defined as the ratio of the stagnation pressure upstream of the fan to the stagnation pressure at the exit of the highest pressure compressor (before the entry to the combustion chamber). By way of a non-limiting example, the overall pressure ratio of a gas turbine engine as described and claimed herein at cruising speed may be greater than (or of the order of magnitude of): 35, 40, 45, 50, 55, 60, 65, 70, 75. The overall pressure ratio may be in an inclusive range delimited by two of the values in the previous sentence (that is to say that the values may form upper or lower limits).

The specific thrust of a gas turbine engine may be defined as the net thrust of the gas turbine engine divided by the total mass flow through the engine. The specific thrust of an engine as described and/or claimed herein at cruise conditions may be less than (or of the order of magnitude of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such gas turbine engines can be particularly efficient in comparison with conventional gas turbine engines.

A gas turbine engine as described and claimed herein may have any desired maximum thrust. Purely by way of a non-limiting example, a gas turbine as described and/or claimed herein may be capable of generating a maximum thrust of at least (or of the order of magnitude of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide vane. At cruising speed, the TET may be at least (or of the order of magnitude of): 1400 K, 1450 K, 1500 K, 1550 K, 1600 K, or 1650 K. The TET at cruising speed may be in an inclusive range delimited by two of the values in the previous sentence (that is to say that the values may form upper or lower limits). The maximum TET in the use of the engine may be at least (or of the order of magnitude of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade as described herein may be manufactured from any suitable material or a combination of materials. For example, at least a part of the fan blade and/or of the airfoil may be manufactured at least in part from a composite, for example a metal matrix composite and/or an organic matrix composite, such as carbon fiber. By way of a further example, at least a part of the fan blade and/or of the airfoil may be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of a further example, the fan blades may be formed integrally with a central portion. Such an arrangement may be referred to as a blisk or a bling. Any suitable method may be used to produce such a blisk or such a bling. For example, at least some of the fan blades may be machined from a block and/or at least some of the fan blades may be attached to the hub/disk by welding, such as linear friction welding, for example.

The gas turbine engines as described and claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine engine as described and claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions during the middle part of the flight, for example the conditions experienced by the aircraft and/or the gas turbine engine at the midpoint (in terms of time and/or distance) between the end of an ascent and the start of a descent.

Purely by way of an example, the forward speed under the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of magnitude of Mach 0.8, of the order of magnitude of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

During use, a gas turbine engine as described and claimed herein may operate at the cruise conditions defined elsewhere herein. Such cruise conditions may be determined by the cruise conditions (for example the conditions during the middle part of the flight) of an aircraft to which at least one (for example 2 or 4) gas turbine engine(s) can be fastened in order to provide thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

Further advantages and advantageous embodiments of the subject matter according to the present disclosure will become apparent from the patent claims and the exemplary embodiments described in principle below with reference to the drawing, with the same reference numbers being used for components that are structurally and functionally the same, for the sake of clarity.

Embodiments will now be described, by way of example, with reference to the figures, in which.

Figure 4:
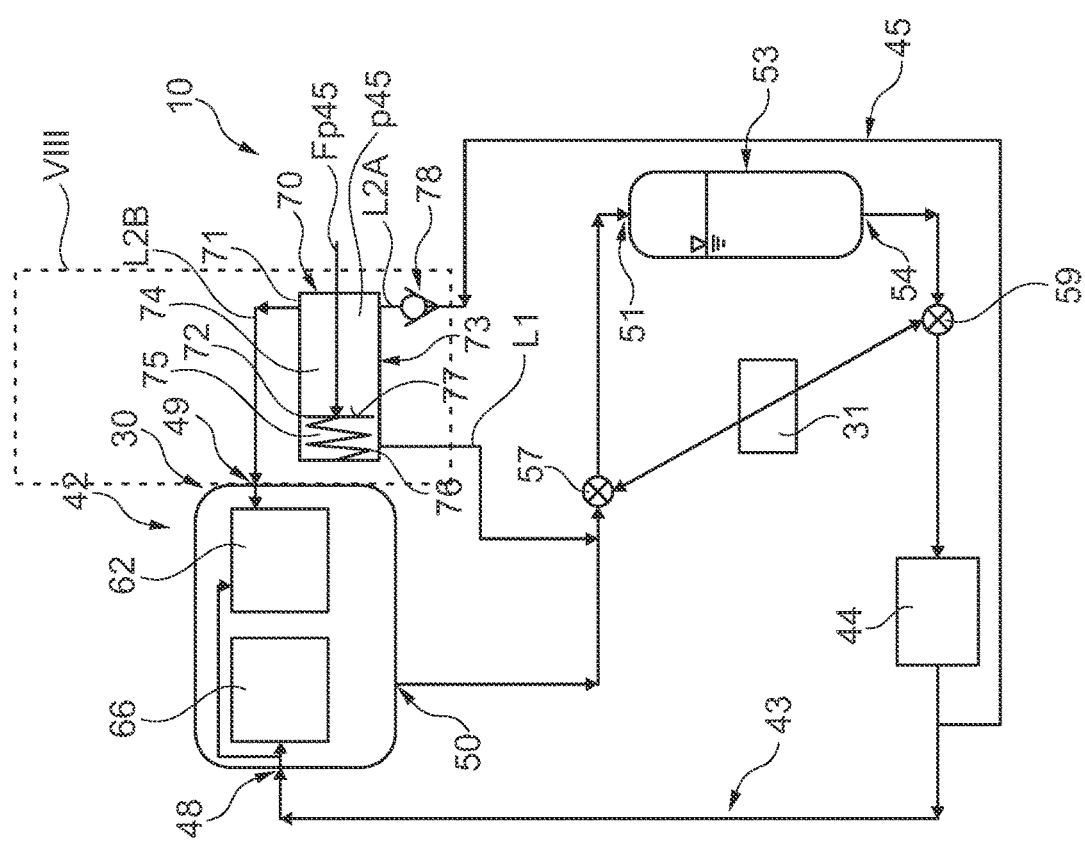
Figure 6:
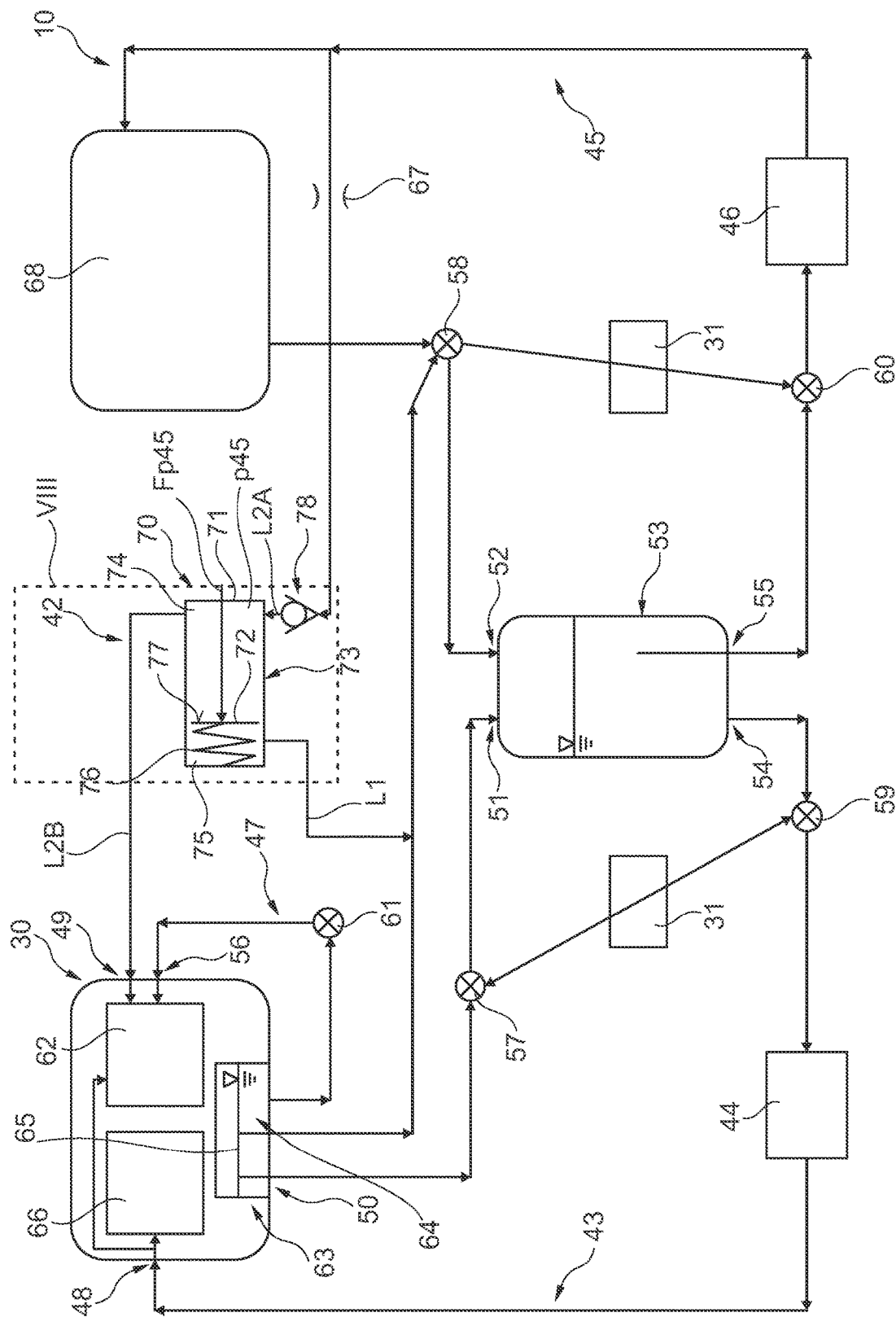
Figure 7:
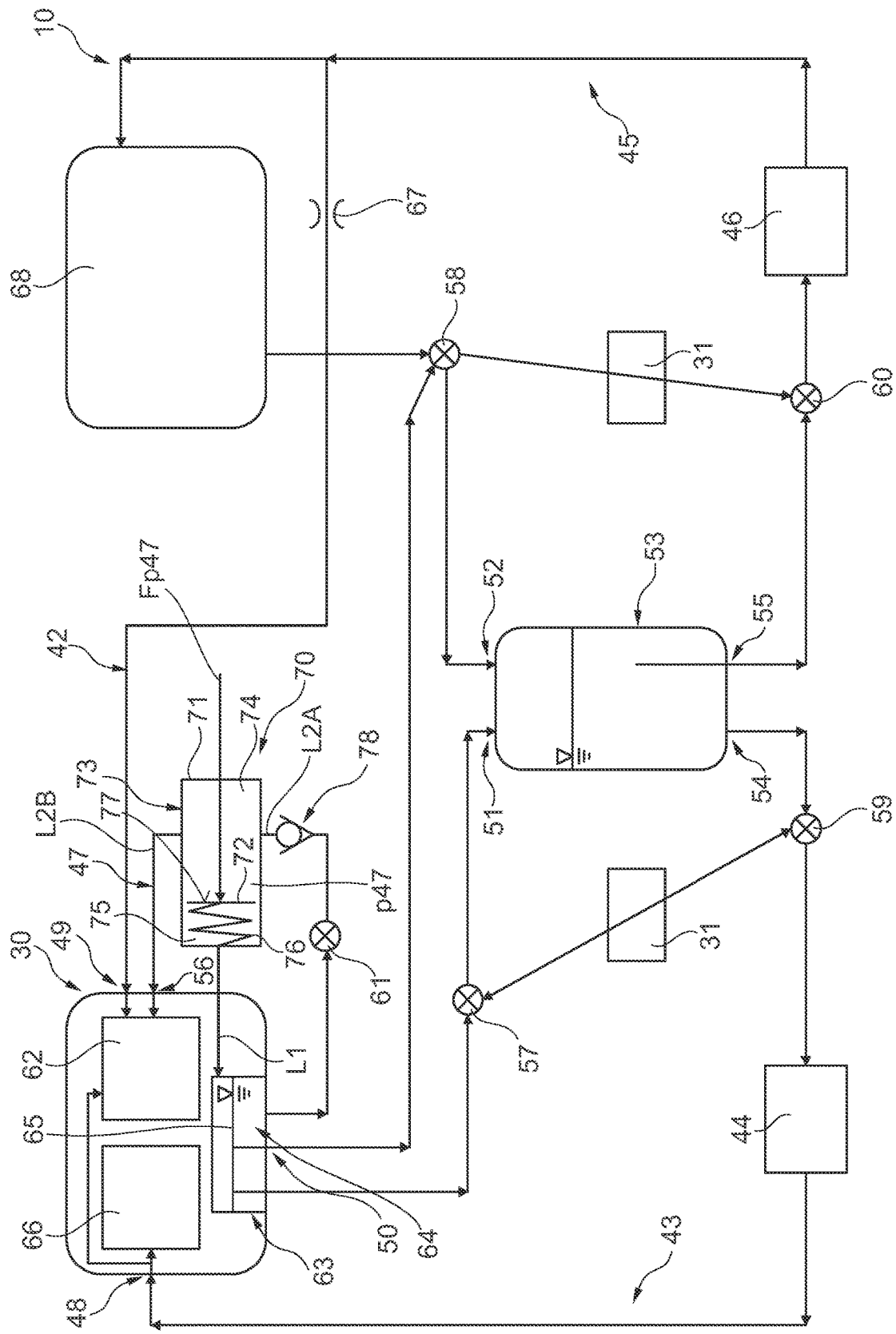
Figure 8:
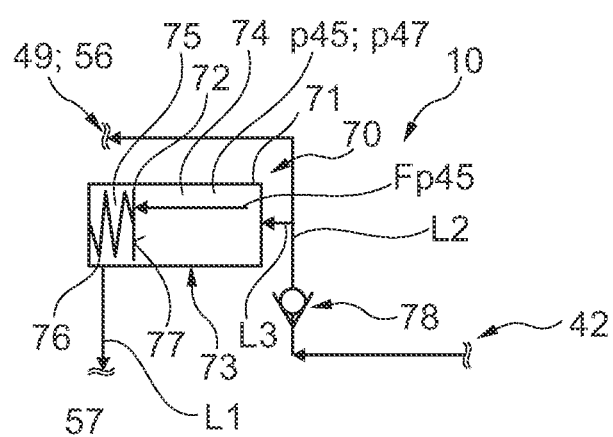

FIG. 4 to FIG. 7 each show a block diagram of a portion of various embodiments of an oil system of a gas turbine engine; and FIG. 8 shows a region VIII, identified in more detail in FIG. 4, of further embodiments of an oil system of a gas turbine engine.

Figure 1:
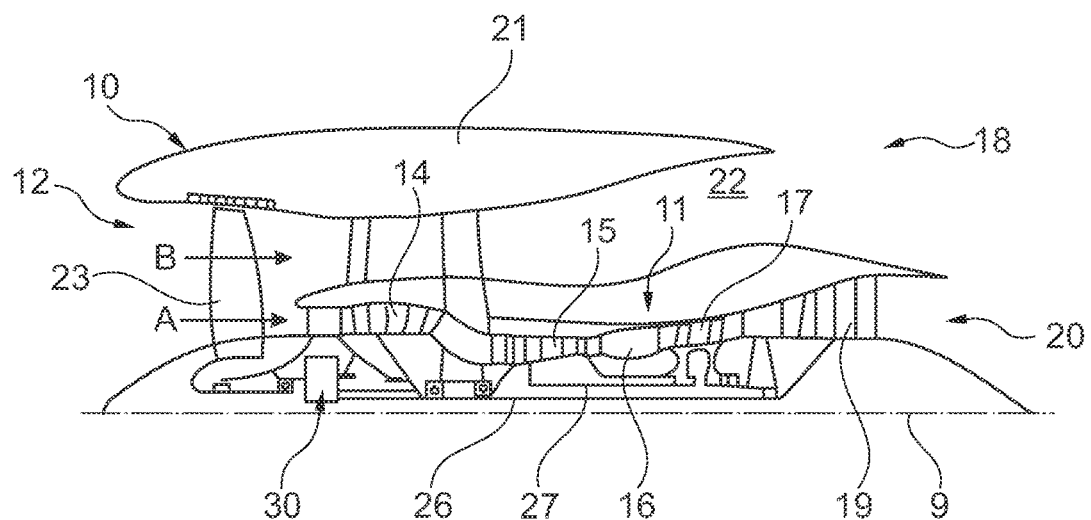
FIG. 1 shows a longitudinal sectional view of a gas turbine engine.

FIG. 1 illustrates a gas turbine engine 10 having a main axis of rotation 9. The engine 10 comprises an air inlet 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic transmission 30. The shaft 26 herein is also referred to as the core shaft.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by way of a suitable connecting shaft 27, which is also referred to as the core shaft. The fan 23 generally provides the majority of the propulsion force. The epicyclic transmission 30 is a reduction transmission.

Figure 2:
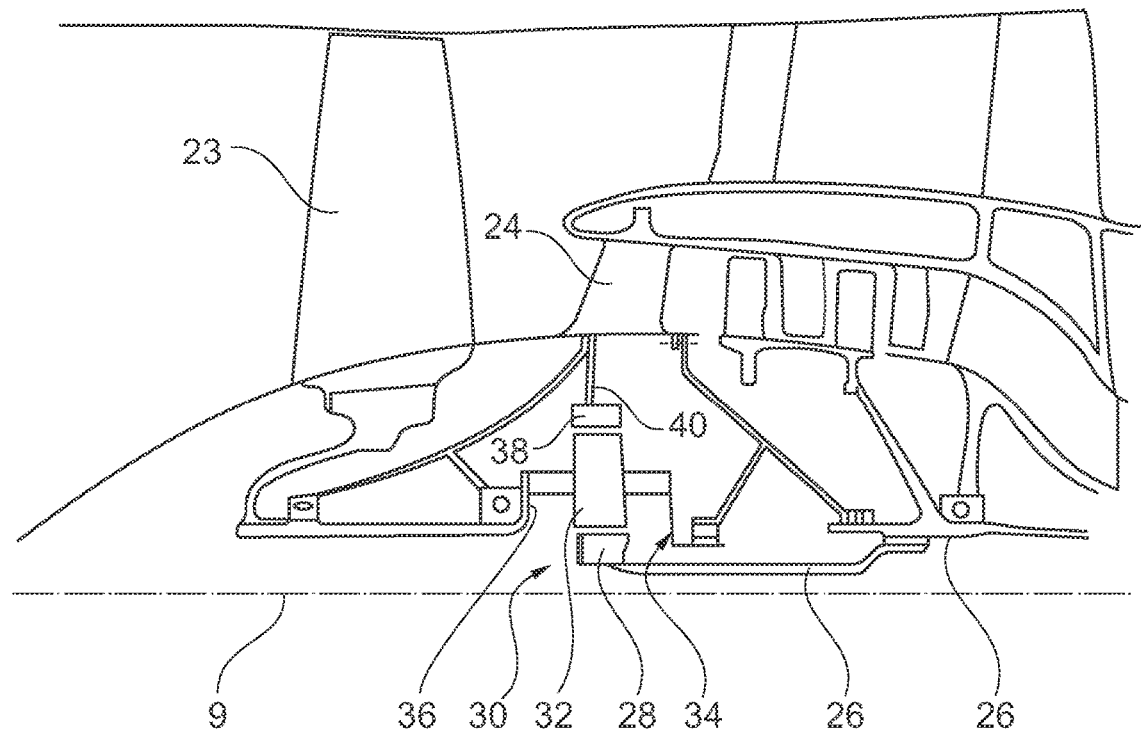
FIG. 2 shows an enlarged partial longitudinal sectional view of an upstream portion of a gas turbine engine.

An exemplary arrangement for a geared-fan gas turbine engine 10 is shown in FIG. 2. The low-pressure turbine 19 (see FIG. 1) drives the shaft 26, which is coupled to a sun gear 28 of the epicyclic transmission arrangement 30. Multiple planet gears 32, which are coupled to one another by means of a planet carrier 34, are situated radially outside the sun gear 28 and mesh with the latter, and are in each case arranged so as to be rotatable on carrier elements 29 which are connected in a rotationally fixed manner to the planet carrier 34. The planet carrier 34 limits the planet gears 32 to orbiting around the sun gear 28 in a synchronous manner while enabling each planet gear 32 to rotate about its own axis on the carrier elements 29. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
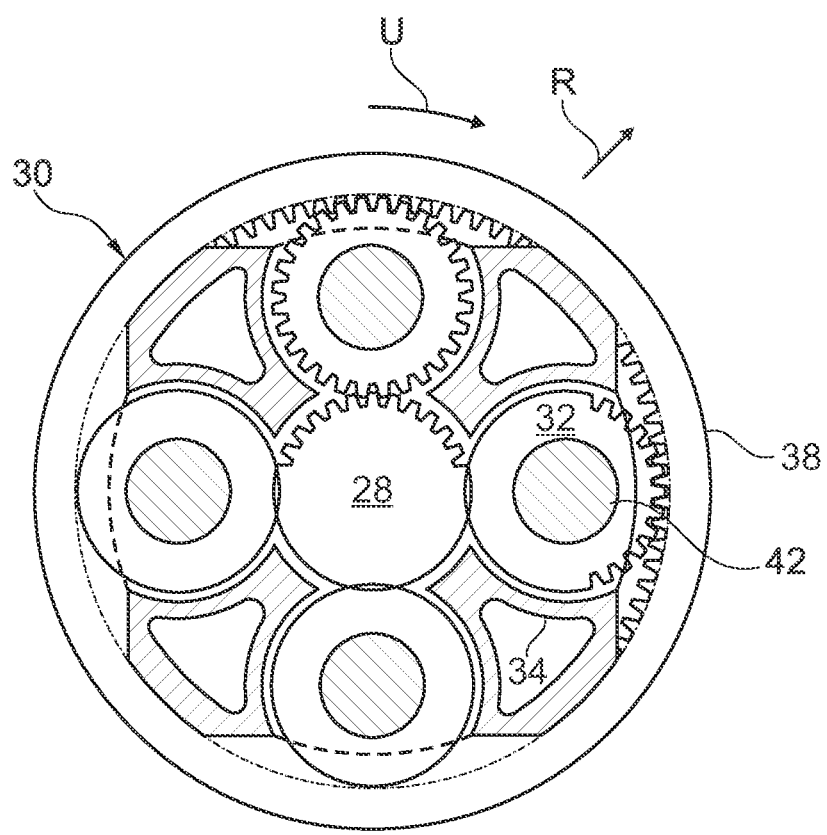
FIG. 3 shows an isolated illustration of a transmission for a gas turbine engine.

The epicyclic transmission 30 is shown in greater detail by way of example in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic transmission 30 generally comprise at least three planet gears 32.

The epicyclic transmission 30 illustrated by way of example in FIGS. 2 and 3 is of the planetary type, in which the planet carrier 34 is coupled to an output shaft via linkages 36, wherein the ring gear 38 is fixed. However, any other suitable type of epicyclic transmission 30 can be used. By way of further example, the epicyclic transmission 30 can be a star arrangement, in which the planet carrier 34 is held so as to be fixed, wherein the ring gear (or annulus) 38 is allowed to rotate. In the case of such an arrangement, the fan 23 is driven by the ring gear 38. As a further alternative example, the transmission 30 can be a differential transmission in which both the ring gear 38 and the planet carrier 34 are allowed to rotate.

It will be appreciated that the arrangement shown in FIGS. 2 and 3 is merely exemplary, and various alternatives fall within the scope of protection of the present disclosure. Purely as an example, any suitable arrangement may be used for positioning the transmission 30 in the engine 10, and/or for connecting the transmission 30 to the engine 10. By way of a further example, the connections (such as the linkages 36, 40 in the example of FIG. 2) between the transmission 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the transmission and the fixed structures, such as the transmission casing) may be used, and the disclosure is not limited to the exemplary arrangement of FIG. 2. For example, where the transmission 30 has a star arrangement (described above), a person skilled in the art will readily understand that the arrangement of output and support linkages and bearing positions would usually be different than that shown by way of example in FIG. 2.

Accordingly, the present disclosure extends to a gas turbine engine having an arbitrary arrangement of transmission types (for example star-shaped or planetary), support structures, input and output shaft arrangement, and bearing positions.

Optionally, the transmission may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of a further example, the gas turbine engine shown in FIG. 1 has a split flow nozzle 20, 22, meaning that the flow through the bypass duct 22 has a dedicated nozzle that is separate from and radially outside the engine core nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure can be applied, for example, to any type of gas turbine engine, such as, for example, an open rotor engine (in which the fan stage is not surrounded by an engine nacelle) or a turboprop engine.

The geometry of the gas turbine engine 10, and components thereof, is or are defined using a conventional axis system which comprises an axial direction (which is aligned with the axis of rotation 9), a radial direction (in the direction from bottom to top in FIG. 1), and a circumferential direction (perpendicular to the view in FIG. 1). The axial, radial and circumferential directions are mutually perpendicular.

Figure 5:
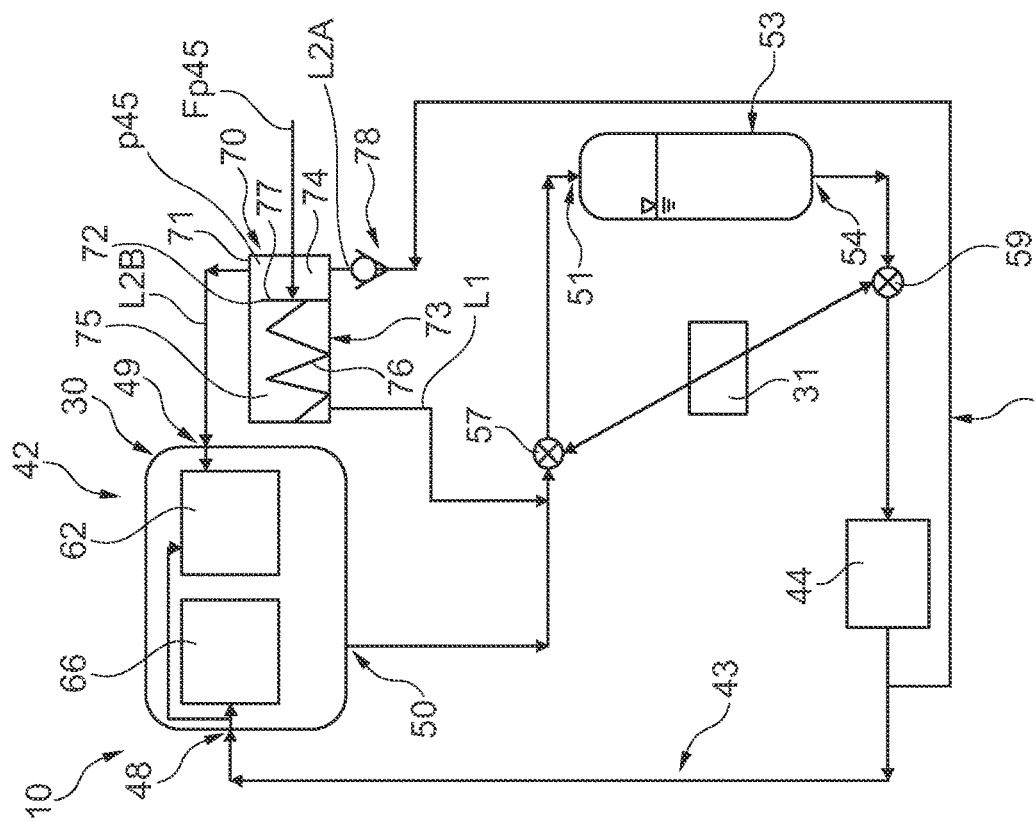

FIG. 4 and FIG. 5 each show a part of a first exemplary embodiment of an oil system 42 of the gas turbine engine 10 in various operating states. The oil system 42 comprises a first oil circuit 43 and a second oil circuit 45. The first oil circuit 43 and the second oil circuit 45 are operatively connected to a return 50 of the transmission 30. Furthermore, the first oil circuit 43 and the second oil circuit 45 are connected to separate inlets 48 and 49 of the transmission 30. Oil from the oil circuits 43 and 45 can be introduced into the transmission 30 via the inlets 48 and 49 to the extent described in more detail below. A hydraulic consumer 62 of the transmission 30 which comprises bearing units, for example plain bearings of the planet gears 32, can be charged with oil via the second oil circuit 45. Oil introduced into the transmission 30 from the first oil circuit 43 via the inlet 48 is fed to the hydraulic consumer 62 and additionally also to other hydraulic consumers 66 of the transmission 30, such as toothings between the sun gear 28 and the planet gears 32 and between the planet gears 32 and the ring gear 38.

A return pump 57 is provided downstream of the return 50 of the transmission 30 and upstream of an oil tank 53, via which oil can be guided from the return 50 of the transmission 30 in the direction of the oil tank 53. The oil is introduced into the oil tank 53 by the return pump 57 via an inlet 51 of the oil tank 53. A feed pump 59 is provided downstream of an outlet 54 of the oil tank 53 and, like the return pump 57, is driven by an auxiliary equipment transmission 31 of the gas turbine engine 10. The auxiliary equipment transmission 31 is operatively connected to the shaft 26 or to the connecting shaft 27 and is rotationally driven in each case by the shaft.

In addition, downstream of the feed pump 59 a heat exchanger 44 is provided, in the region of which the oil guided through the transmission 30 and the oil tank 53 is cooled or temperature-controlled in a manner known per se. Downstream of the heat exchanger 44, the second oil circuit 45 branches off in the direction of the inlet 49 and the first oil circuit 43 continues in the direction of the inlet 48 of the transmission 30.

In addition, the second oil circuit 45 downstream of the heat exchanger 44 and upstream of the inlet 49 comprises an oil accumulator 70 which is connected to the inlet 49 via a line L2B and to the heat exchanger 44 via a line L2A. The oil accumulator 70 is designed as a spring accumulator. In this case, the oil accumulator 70 has a piston 72 of a piston-cylinder unit 73, which piston is arranged in a cylinder 71 of the piston-cylinder unit 73 in a longitudinally displaceable manner. The piston 72 is cushioned against a supply pressure p45 acting in the second oil circuit 45 upstream of the inlet 49. The piston 72 and the cylinder 71 delimit an oil storage chamber 74. The volume of the oil storage chamber 74 varies depending on an axial position of the piston 72 in the cylinder 71.

The line L2A of the second oil circuit 45 opens into the oil storage chamber 74 downstream of the return 50 or downstream of the heat exchanger 44. The oil storage chamber 74 is connected to the inlet 49 via the further line L2B. On that side of the piston 72 which faces away from the oil storage chamber 74, the piston 72 and the cylinder 71 delimit a piston chamber 75. In the piston chamber 75 there is a spring unit 76, the spring force of which counteracts a compressive force Fp45 acting on the piston 72. The compressive force Fp45 corresponds to the product of the supply pressure p45 of the second oil circuit 45 acting in the oil storage chamber 74 and an effective surface 77 of the piston 72, to which the supply pressure p45 is applied.

In the present case, the piston chamber 75 or the spring chamber is in operative connection via a line L1 to the two oil circuits 43 and 45 in the region between the return 50 of the transmission 30 and the return pump 57. Since this region of the two oil circuits 43 and 45 is substantially pressure-free, the piston chamber 75 is correspondingly vented via the line L1. This ensures that no pressure builds up in the piston chamber 75 due to leakage oil volume flows from the oil storage chamber 74 in the direction of the piston chamber 75 that counteracts an axial adjustment movement of the piston 72, during which the volume of the oil storage chamber 74 increases and the oil volume stored in the oil accumulator 70 increases.

The second oil circuit 45 has a nonreturn valve 78 between the heat exchanger 44 and the oil accumulator 70. The nonreturn valve 78 releases the connection between the heat exchanger 44 and the oil accumulator 70, and therefore between the return 50 and the oil accumulator 70, when there is a positive pressure drop between the pressure in the region of the second oil circuit 45 upstream of the nonreturn valve 78 and the pressure in the region of the second oil circuit 45 downstream of the nonreturn valve 78.

This is the case when the feed pressure of the feed pump 59 is of such a magnitude that the supply pressure p45 holds the piston 72 in the position shown in FIG. 4 or transfers same in the direction of this position and oil stored in the oil accumulator 70 from the spring unit 76 via the line L2B is not pushed out of the oil accumulator 70 in the direction of the inlet 49.

If the feed pressure of the feed pump 59 drops, for example because a filling level of the oil tank 53 is too low, and the spring force of the spring unit 76 exceeds the compressive force Fp45 acting on the piston 72, the spring unit 76 increasingly pushes the piston 72 in the direction of the position shown in FIG. 5. The volume of the oil storage chamber 74 is continuously reduced and the oil volume stored in the oil accumulator 70 is guided in the direction of the inlet 49 via the line L2B. During such an operating state of the oil system 42, the supply pressure p45 downstream of the nonreturn valve 78 is greater than the feed pressure of the feed pump 59. The nonreturn valve 78 then blocks the operative connection between the heat exchanger 44 and the oil accumulator 70. The hydraulic consumer 62 of the transmission 30 is then acted upon by the volume of oil stored in the oil accumulator 70 and an undersupply of lubricant and cooling oil that impairs the functioning of bearing units of the hydraulic consumer 62 is avoided to the desired extent.

In the oil system 42 according to FIG. 4 and FIG. 5, the oil is guided through the oil storage chamber 74 between the heat exchanger 44 and the inlet 49 of the second oil circuit 45. As a result, a flushing oil volume flow flows through the oil storage chamber 74 in the normal operating state, during which there is a sufficient supply of oil to the transmission 30 via the second oil circuit 45 and during which no volume of oil is pushed out of the oil storage chamber 74 in the direction of the inlet 49 of the second oil circuit 45 by the spring force of the spring unit 76. This is a simple way of avoiding the oil stored in the oil storage chamber 74 having too long a dwell time in the oil storage chamber 74 and its temperature rising to an undesirable extent. The resulting limitation of the oil temperature in the oil accumulator 70 prevents, in a simple manner, the oil stored in the oil accumulator 70 from igniting due to operating temperatures that are too high.

There is also the possibility that oil is guided from the oil storage chamber 74 in the direction of the piston chamber 75 if the supply pressure p45 is greater than the pressure in the piston chamber 75. The oil storage chamber 74 is then additionally flushed through with oil and an undesired increase in the operating temperature of the oil stored in the oil storage chamber 74 is avoided.

The opening regions of the lines L2A and L2B can be offset from one another in the circumferential direction and/or in the axial direction of the cylinder 71 in such a manner that the flow path of the oil volume flow guided through the oil storage chamber 74 is as long as possible and a greatest possible amount of heat is carried away from the oil accumulator 70 via the flushing oil volume flow.

The oil can be guided from the oil storage chamber 74 into the piston chamber 75, for example in the region of one or more bores in the piston 72 and/or via one or more recesses, such as a groove or the like, provided in the contact region between an outer side of the piston 72 and an inner side of the cylinder 71. Furthermore, there is also the possibility of releasing or blocking the connection between the oil storage chamber 74 and the piston chamber 75 depending on the pressure drop between the pressure in the oil storage chamber 74 and the pressure in the piston chamber 75. In any case, the flow cross section, which is available for the flushing oil flow, of the bores and/or recesses is dimensioned in such a way that the functioning of the oil accumulator 70 is not impaired by the flushing oil volume flow.

FIG. 6 and FIG. 7 respectively show an illustration corresponding to FIG. 4 of a second and a third exemplary embodiment of the oil system 42 of the gas turbine engine 10, which are also designed with the oil accumulator 70 and with the nonreturn valve 78 and have a similar structure to the oil system 42 according to FIG. 4. For this reason, essentially only the differences between the oil system 42 according to FIG. 6 or according to FIG. 7 and the oil system 42 according to FIG. 4 or between the oil systems 42 according to FIG. 6 and FIG. 7 are explained in more detail in the following description. With regard to the further functioning of the oil system 42 according to FIG. 6 and according to FIG. 7, reference is otherwise made to the above description of FIG. 4 and FIG. 5.

The oil systems 42 according to FIG. 6 and FIG. 7 each comprise a first oil circuit 43 with a heat exchanger 44, a second oil circuit 45 with a heat exchanger 46, and a third oil circuit 47. The first oil circuit 43 and the second oil circuit 45 are connected to inlets 48, 49 of the transmission 30 and to the return 50 of the transmission 30. Furthermore, oil can be guided from the oil tank 53 to the turbomachine 68 of the gas turbine engine 10 via the second oil circuit 45. The hydraulic consumers 66 and the hydraulic consumer 62 of the transmission 30 can be charged with oil via the inlet 48. In contrast to this, oil from the second oil circuit 45 can only be guided to the hydraulic consumer 62 of the transmission 30 via the inlet 49.

In addition, the first oil circuit 43 downstream of the return 50 of the transmission 30 is connected to the inlet 51 of the oil tank 53 and the second oil circuit 45 downstream of the return 50 is connected to a further inlet 52 of the oil tank 53. The third oil circuit 57 is in operative connection with an inlet 56 of the transmission 30 and with the return 50 of the transmission 30.

In addition, the first oil circuit 43 and the second oil circuit 45 each comprise a return pump 57, 58 and a feed pump 59, 60, which can be driven by the shaft 26 and thus by the auxiliary equipment transmission 31 of the gas turbine engine 10. In addition, the third oil circuit 47 is designed with a feed pump 61 that can be driven by the fan 23.

Oil can be introduced from the oil tank 53 into the transmission 30 via the first oil circuit 43 and the second oil circuit 45. In contrast to this, oil from the return 50 of the transmission 30 is guided directly to the inlet 56 of the transmission 30 via the third oil circuit 47, with the oil being forwarded from the inlet 56 in the direction of the hydraulic consumer 62.

The heat exchanger 44 of the first oil circuit 43 is arranged between the feed pump 59 and the inlet 48 of the transmission 30. The heat exchanger 46 of the second oil circuit 45 is arranged between the feed pump 60 and an optional throttle 67 which can be provided between the inlet 49 of the transmission 30 and the feed pump 60 of the second oil circuit 45.

The return 50 of the transmission 30 comprises a device 63. Oil is conducted from the transmission 30 into the first oil circuit 43, into the second oil circuit 45 and into the third oil circuit 47 via the device 63 when the transmission 30 is subjected to an oil volume flow greater than a predefined value or an operating value differs from a defined operating value of the gas turbine engine 10 corresponding to this oil flow rate. Additionally, the device 63 is configured to conduct the oil from the transmission 30 into the third oil circuit 47 when the supply to the transmission is less than or equal to the predefined flow rate, or less than or equal to at least one corresponding operating value, or greater than or equal to at least one other corresponding operating value.

For this purpose, the device 63 includes an oil reservoir 64 from which oil taken up by the transmission 30 can be returned directly to the transmission 30 via the third oil circuit 47 and to the oil tank 53 via the first oil circuit 43 and the second oil circuit 45. From the oil reservoir 64, the oil is conducted directly to the inlet 56 of the transmission 30 only via the third oil circuit 47 as long as the filling level of the oil reservoir 64 is below the defined filling level 65 of the oil reservoir 64. In addition, oil is conducted via the first oil circuit 43 and via the second oil circuit 45 into the oil tank 53 and via the third oil circuit 47 to the inlet 56 as soon as the defined filling level 65 of the oil reservoir 64 is reached.

In the oil system 42 according to FIG. 6, the oil accumulator 70 is arranged downstream of the throttle 67 and upstream of the inlet 49 in the second oil circuit 45. The oil storage chamber 74 is connected via the line L2A to the nonreturn valve 78 which is arranged upstream of the oil accumulator 70 in the second oil circuit 45. In addition, the oil storage chamber 74 is directly connected to the inlet 49 via the line L2B. The nonreturn valve 78 is arranged between the oil accumulator 70 and the throttle 67. The line L1 connects the piston chamber 75 of the oil accumulator 70, in the exemplary embodiment of the oil system 42 shown in FIG. 6, to the second oil circuit 45 in the region between the return 50 of the transmission 30 and the return pump 58. The piston chamber 75 is vented via the line L1 in order to avoid a pressure increase in the piston chamber 75 and a resulting impairment of the functioning of the oil accumulator 70.

In contrast to the oil system 42 according to FIG. 6, the oil accumulator 70 is integrated in the third oil circuit 47 in the oil system 42 according to FIG. 7. The oil accumulator 70 or its oil storage chamber 74 and the nonreturn valve 78 are arranged between the feed pump 61 and the inlet 56 of the transmission 30 in order to supply the hydraulic consumer 62 with oil stored in the oil storage chamber 74 in the event of a correspondingly low supply pressure p47 and a correspondingly low compressive force Fp47 upstream of the inlet 56, in the manner described for FIG. 4 and FIG. 5. The oil storage chamber 74 is connected directly to the inlet 56 via the line L2B and to the nonreturn valve 78 via the line L2A. The nonreturn valve 78 is arranged upstream of the oil accumulator 70 and between the feed pump 61 and the oil storage chamber 74 in the third oil circuit 47. The piston chamber 75 is connected to the oil reservoir 64 of the return 50 of the transmission 30 via the line L1 for venting purposes.

FIG. 8 shows an individual illustration of a region VIII of further embodiments of the oil system 42, which is identified in more detail in FIG. 4, FIG. 6 and FIG. 7. The region VIII comprises the oil accumulator 70 and the nonreturn valve 78. In the embodiments of the oil system 42 according to FIG. 8, the oil storage chamber 74 of the oil accumulator 70 is connected via a so-called stub line L3 by a line L2 running between the nonreturn valve 78 and the inlet 49 of the second oil circuit 45 according to FIG. 4 or according to FIG. 6, or the inlet 56 of the third oil circuit 47, to the second oil circuit 45 and to the third oil circuit 47, respectively.

In order to avoid an undesired rise in temperature of the oil stored in the oil storage chamber 74, in these embodiments of the oil system 42, during operation of the gas turbine engine 10, oil can in each case be conducted out of the oil storage chamber 74 into the piston chamber 75 and from there in the direction of the region of the oil system 42 downstream of the return 50 of the transmission 30 or into the oil reservoir 64 from the piston chamber 75. The oil storage chamber 74 is thus flushed through with oil starting from the line L2 in the direction of the piston chamber 75, and a flushing oil volume flow through the oil storage chamber 74 that limits the temperature of the oil in the oil storage chamber 74 is produced.

It will be understood that the invention is not limited to the above-described embodiments and various modifications and improvements can be made without departing from the concepts described herein. Any of the features may be used separately or in combination with any other features, unless they are mutually exclusive, and the disclosure extends to and includes all combinations and subcombinations of one or more features that are described herein.

LIST OF REFERENCE SIGNS

9 Main axis of rotation
10 Gas turbine engine
11 Core
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Thrust fan
24 Support structure
26 Shaft, connecting shaft
27 Connecting shaft
28 Sun gear
30 Transmission, planetary transmission
31 Auxiliary equipment transmission
32 Planet gear
34 Planet carrier
36 Linkage
38 Ring gear
40 Linkage
42 Oil system
43 First oil circuit
44 Heat exchanger
45 Second oil circuit
46 Heat exchanger
47 Third oil circuit
48, 49 Inlet of the transmission
50 Return of the transmission
51, 52 Inlet of the oil tank
53 Oil tank
54, 55 Outlet of the oil tank
56 Inlet of the transmission
57, 58 Return pump
59, 60 Feed pump
61 Feed pump
62 Hydraulic consumers
63 Device
64 Oil reservoir
65 Level
66 Further hydraulic consumers of the transmission
67 Throttle
68 Further regions of the gas turbine engine, turbomachine
70 Oil accumulator
71 Cylinder
72 Piston
73 Piston-cylinder unit
74 Oil storage chamber
75 Piston chamber
76 Spring unit
77 Effective area of the piston
78 Nonreturn valve
Fp45, Fp47 Compressive force
L1, L2, L2A, L2B Line
L3 Stub line
p45, p47 Supply pressure

The invention claimed is:

1. An oil system of a gas turbine engine, comprising:
a first oil circuit and
a second oil circuit,
wherein, via the first and second oil circuits, a hydraulic consumer of a transmission of the gas turbine engine is charged with oil,
wherein oil is introduced from the transmission into the first and second oil circuits downstream of the hydraulic consumer in a region of a return of the transmission and is introduced into the transmission from the first and second oil circuits upstream of the hydraulic consumer in a region of inlets to the transmission, and
wherein the second oil circuit includes an oil accumulator between the return of the transmission and an inlet of the second oil circuit, said oil accumulator being configured such that oil is stored in the oil accumulator depending on a supply pressure of the oil upstream of the inlet of the second oil circuit or oil stored in the oil accumulator is guided in a direction of the inlet of the second oil circuit;
wherein the oil accumulator is configured as a spring accumulator including a spring, and a piston and cylinder of a cylinder-piston unit, the piston being arranged in a longitudinally displaceable manner in the cylinder and being cushioned against the supply pressure acting in the second oil circuit by the spring;
wherein the piston and the cylinder delimit an oil storage chamber, a volume of which varies depending on an axial position of the piston in the cylinder, wherein oil is introduced into the oil storage chamber by the supply pressure in a region downstream of the return of the transmission and upstream of the inlet of the second oil circuit counter to the spring force;

wherein the piston and the cylinder further delimit a piston chamber, containing the spring, on an opposite side of the piston from the oil storage chamber; wherein an only flow of oil to the piston chamber occurs via flow from the oil storage chamber past the piston; wherein oil is guided from the piston chamber in a direction of a substantially pressure-free region of the oil system.

2. The oil system as claimed in claim 1, wherein oil is introduced from the oil storage chamber into the second oil circuit upstream of the inlet of the second oil circuit by a spring force of the spring counter to the supply pressure.

3. The oil system as claimed in claim 2, wherein the oil storage chamber upstream of the inlet of the second oil circuit is connected via a stub line to a line of the second oil circuit, said line running in the direction of the inlet of the second oil circuit.

4. The oil system as claimed in claim 2, wherein downstream of the return a line of the second oil circuit opens into the oil storage chamber and the oil storage chamber is connected to the inlet of the second oil circuit via a further line of the second oil circuit, said further line running into the transmission between the oil storage chamber and the inlet of the second oil circuit.

5. The oil system as claimed in claim 2, wherein the spring force of the spring, which acts on the piston and counteracts a compressive force that is equal to a product of the supply pressure, acting in the oil storage chamber, of the second oil circuit and an effective surface of the piston, to which the supply pressure is applied, the spring force and the effective surface of the piston being matched to one another such that oil stored in the oil storage chamber is urged by the spring out of the oil storage chamber in the direction of the inlet of the second oil circuit when the pressure in the oil storage chamber is smaller than a defined value of the supply pressure.

6. The oil system as claimed in claim 1, and further comprising an oil pump, by which oil is conveyed in the direction of the inlets to the transmission, the oil pump arranged between the return of the transmission and the inlets to the transmission.

7. The oil system as claimed in claim 1, wherein the second oil circuit includes a nonreturn valve upstream of the oil accumulator, the nonreturn valve releasing a fluid connection between the return of the transmission and the oil accumulator when there is a positive pressure drop between a pressure in a region of the second oil circuit upstream of the nonreturn valve and a pressure in a region of the second oil circuit downstream of the nonreturn valve.

8. The oil system as claimed in claim 1, wherein the second oil circuit next to the inlet of the second oil circuit, via which the hydraulic consumer of the transmission is supplied with the oil from the second oil circuit, is in operative connection with further regions of the gas turbine engine.

9. The oil system as claimed in claim 1, wherein only the hydraulic consumer of the transmission is charged with oil from the oil accumulator via the inlet of the second oil circuit.

10. The oil system as claimed in claim 1, wherein the oil accumulator is connected directly to the inlet of the second oil circuit via a line.

11. The oil system as claimed in claim 1, and further comprising a third oil circuit, via which the oil is introduced directly from the return of the transmission via an inlet of the third oil circuit into the transmission and fed to the hydraulic consumer.

12. The oil system as claimed in claim 1, and further comprising a third oil circuit, via which the oil is introduced from the return of the transmission via an inlet of the third oil circuit into the transmission and is fed to the hydraulic consumer, with further regions of the gas turbine engine additionally being supplied with the oil via the third oil circuit.

13. A gas turbine engine for an aircraft having the oil system as claimed in claim 1.

14. The gas turbine engine as claimed in claim 13, and further comprising:
- an engine core having a turbine, a compressor and a core shaft connecting the turbine to the compressor;
- a fan positioned upstream of the engine core, the fan comprising a plurality of fan blades; and
- a transmission receiving an input from the core shaft and outputting drive for the fan for driving the fan at a lower rotational speed than the core shaft.

15. The gas turbine engine as claimed in claim 13, wherein:
- the turbine is a first turbine, the compressor is a first compressor, and the core shaft is a first core shaft;
- the engine core further comprises a second turbine, a second compressor, and a second core shaft connecting the second turbine to the second compressor; and
- the second turbine, the second compressor, and the second core shaft are arranged to rotate at a higher rotational speed than the first core shaft.

* * * * *